United States Patent [19]

Martin

[11] 4,395,916

[45] Aug. 2, 1983

[54] ARRANGEMENT FOR SEALING A REACTIVE ELEMENT WITHIN A FLUID PRESSURE TRANSDUCER

[75] Inventor: Kenneth A. Martin, Windsor, Conn.

[73] Assignee: Combustion Engineering, Inc., Windsor, Conn.

[21] Appl. No.: 335,794

[22] Filed: Dec. 30, 1981

[51] Int. Cl.³ ............................................. G01L 9/10
[52] U.S. Cl. ..................................... 73/722; 73/728; 336/30
[58] Field of Search .................... 73/722, 728; 336/30

[56] References Cited

U.S. PATENT DOCUMENTS

| 2,641,742 | 6/1953 | Wolfe et al. | 73/722 |
| 2,986,715 | 5/1961 | Church et al. | 336/30 |
| 3,126,518 | 3/1964 | Johannson | 336/30 |
| 3,147,454 | 9/1964 | Epstein | 336/30 |

*Primary Examiner*—Donald O. Woodiel
*Attorney, Agent, or Firm*—L. James Ristas

[57] ABSTRACT

An improvement in fluid pressure transducers having a housing with oppositely facing magnetic blocks (12,14) that form a sealed chamber (20) in which a magnetically permeable diaphragm (24) is disposed for magnetic coupling with electromagnetic coils (30) mounted within the blocks. The coil is mounted on an elongated plug (34) and covered by a non-magnetic, unitary metal cap (36) that is flexibly sealed between the chamber and the coil. The cap has a generally cup-like inner portion (48) for covering the coil and a flat rim portion (46) that is sealingly (58) secured between the mounting plug and shoulder means (50,60) within the block.

6 Claims, 2 Drawing Figures

ARRANGEMENT FOR SEALING A REACTIVE ELEMENT WITHIN A FLUID PRESSURE TRANSDUCER

BACKGROUND OF THE INVENTION

This invention relates to pressure gauges and more particularly to the type of pressure gauge that uses a reactive electronic element as a transducer to convert a pressure differential to a voltage differential.

Pressure gauges for nuclear power plants must be capable of reliably operating over a wide range of severe environmental conditions of temperature, radiation, and seismic shock. One suitable gauge is described in co-pending patent application U.S. Ser. No. 273,871, filed Jan. 2, 1981, for "VARIABLE RELUCTANCE PRESSURE TRANSDUCER" wherein the transducer consists of two oppositely disposed housing blocks defining a sealed inner chamber in which is disposed a magnetically permeable diaphragm. Fluid is introduced into the chamber such that the differential pressure to be measured deflects the diaphragm. Mounted within the blocks on either side of the diaphragm are two inductance coils which are magnetically coupled to the diaphragm.

The sensor coils must not be exposed to the fluid in the chamber, and any cover between the coils and the chamber must not interfere with the magnetic coupling to the diaphragm. Therefore, the coil cover must be non-magnetic, although the preferred material of the blocks is magnetic. Additionally, the cover must be strong enough to resist overpressure of the fluid, have thermal expansion properties that are compatible with the block and coil mounting structure, and be immune to corrosion. The prior art as represented by the aformentioned copending application is not completely satisfactory in meeting these requirements. In one embodiment of said co-pending application, each block is made from non-magnetic stainless steel, and includes a solid, integral web of block material over the coil detector. While providing overpressure protection and sealing against the fluid, the non-magnetic block has different thermal expansion properties from the magnetic diaphragm. At higher temperatures, thermal stresses are imposed on the diaphragm resulting in erroneous pressure measurement. These thermal stresses cannot be compensated by electronic signal processing.

Another embodiment of the co-pending application includes use of a non-magnetic seal disk over the element welded to an opening in the magnetic block. The problems associated with the welded disk include potential for weld cracking due to differential thermal expansion, and long-term crevice corrosion at the disk and block interface. Also, since the disk must be recessed slightly from the chamber to allow room for a weld bead along its periphery, overpressurization of the diaphragm against the disk can produce permanent diaphragm deformation.

SUMMARY OF THE INVENTION

The present invention is an improvement in fluid pressure transducers having a housing with oppositely facing magnetic blocks that form a sealed chamber in which a magnetically permeable diaphragm is disposed for magnetic coupling with reactive elements mounted within the blocks. The invention provides an improved mounting arrangement for the element in which a non-magnetic, unitary metal cap is flexibly sealed between the chamber and the element.

The arrangement includes a bore hole extending through the block to the chamber, counterbored to provide shoulder means relative to the bore axis. An elongated mounting plug having a shouldered head portion for engaging the bore hole shoulder means and a pedestal portion for supporting an element near the chamber is provided. The metal cap has a generally cup-like inner portion for covering the elements and a flat rim portion which rests on the plug between the plug shoulder and the bore hole shoulder means. A flexible seal member is located between the rim of the cap and the bore hole shoulder means. Preferably the bore hole is double counter bored so that the flexible seal member is in contact with the second bore hole shoulder while the plug shoulder is in contact with the first bore hole shoulder. The arrangement also includes means for advancing and retaining the plug in the bore hole such that the seal member is compressed against the shoulder means to form a seal against the intrusion of fluid from the chamber into the bore hole.

Preferably, the cup-like portion of the cover is of smaller diameter than the bore hole penetration into the chamber such that when the plug, rim, and flexible seal are all compressed against the bore hole shoulder means, the cup-portion of the cap is spaced from the adjacent sidewalls of the bore holes. This spacing permits differential expansion between the non-magnetic cup and the magnetic block.

The invention overcomes all the previously mentioned problems associated with prior art gauges, namely, (a) the reactive element is pressure sealed from the fluid in the chamber, (b) the block and diaphragm is made of magnetic material while the cover is non-magnetic, (c) differential expansion of the cover and the block does not produce stresses that could be transmitted to the diaphragm and (d) the sealed surface between the block and the cap is not subject to significant corrosion.

BRIEF DESCRIPTION OF THE DRAWINGS

The preferred embodiment of the invention will be described with reference to the accompanying drawings, in which.

DESCRIPTION OF THE PREFERRED EMBODIMENT

Figure 1:
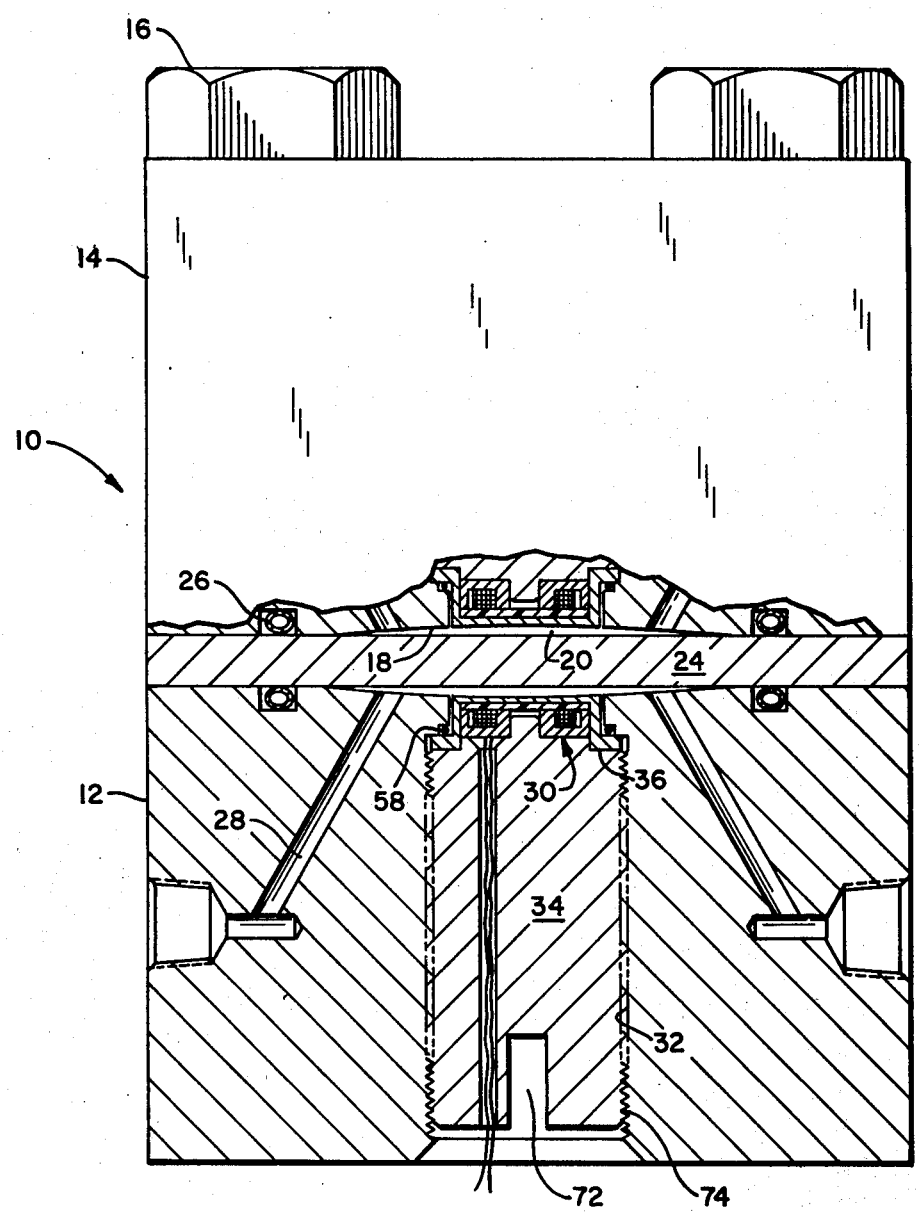
FIG. 1 is a partial cut-a-way view of a schematic representation of a typical pressure transducer of the type embodying the invention.

FIG. 1 shows a pressure transducer 10 including a housing formed by two oppositely facing blocks 12,14 secured together by, for example, bolts 16. Typically, the housing is made of a magnetic material such as type 430 stainless steel. The central portion of each block is machined such that when the contoured walls 18 are brought together a chamber 20 is formed between the blocks. The walls 18 could alternatively be formed by straight counterbore. A magnetically permeable diaphragm 24 is secured between the blocks 12,14 to divide the chamber 20 whereby fluid at different pressures may be supplied to either side of the diaphragm 24 for determining, for example, differential pressure. Typically, the diaphragm is sealed through the use of spring loaded metal O-ring seals 26. Fluid ports 28 are shown providing a fluid pressure to the lower portion chamber 20. It should be understood that the structures shown in block 12 have identical counterparts in block 14.

On either side of the diaphragm 24, reactive elements 30 are mounted within the respective blocks 12,14 in proximity of the diaphragm (24) so that magnetic coupling between the reactive element and the diaphragm can be maintained. As is well known, an alternating signal is provided to the reactive elements, preferably in inductance coils. Typically an electrical bridge (not shown) for sensing differential changes in reluctance, provides the monitoring of differential pressure between the chamber portions as manifest by deflection of the diaphragm 24. Since each reactive element is magnetically coupled to the diaphragm 24, any deflection of the diaphragm will produce a differential change in the reluctances of the reactive elements.

According to the present invention, a novel arrangement for mounting the reactive element within the mounting blocks 12,14 is provided such that the aforementioned problems associated with the prior art are overcome. A bore hole 32 extends through the block 12 to the chamber 20. The reactive element 30 is carried on a mounting plug 34 which in turn carries a non-magnetic metal cap 36 which serves to protect the reactive element from the contact with the fluid in the chamber 20, and which provides a secure seal that is immune from failure due to differential expansion or corrosion.

Figure 2:
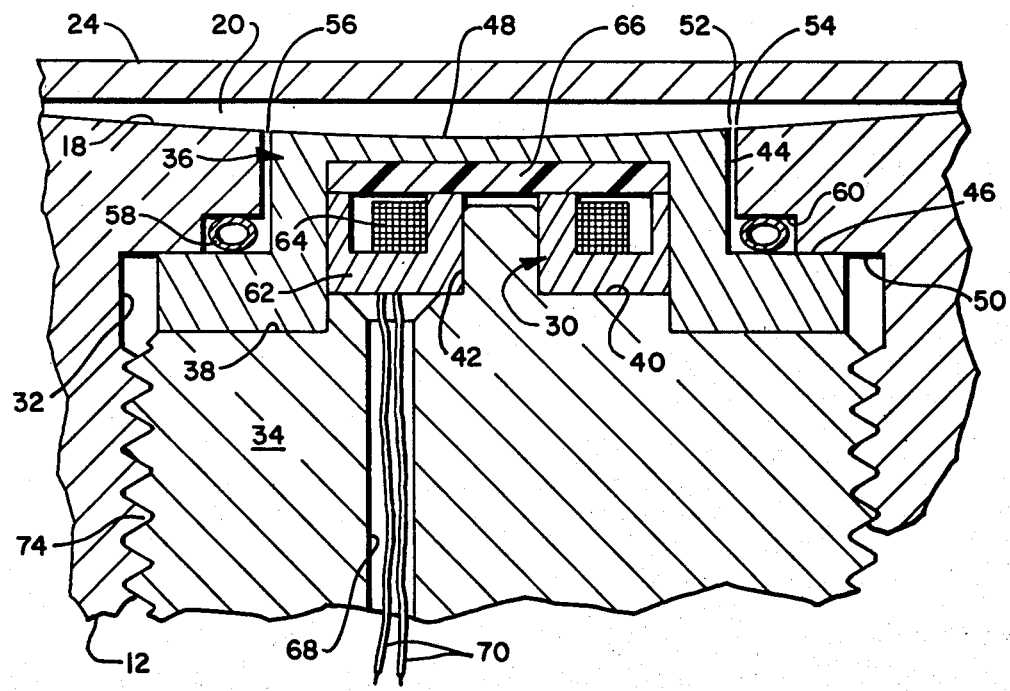
FIG. 2 is an enlarged section view of the invention showing the seal between the reactive element and the transducer housing.

Referring now to FIG. 2, the preferred embodiment of the sealing arrangement will be described in detail. In this embodiment, the housing blocks 12,14, plug 34, reactive element 30, and metal cap 36 are all generally in the form of right cylinders. The plug has a shouldered head portion 38 for supporting the metal cap, and preferably a pedestal portion 40 for supporting the reactive element near the chamber 20. In the illustrated embodiment, means, such as a central pin portion 42, are provided for aligning the annular reactive element on the pedestal portion. The metal cap 36 is made of a non-magnetic material such as type 316L stainless steel, whereas the diaphragm and housing are typically made of magnetic stainless steel. The metal cap has a generally cup-like inner portion 44 for covering the reactive element and a flat, rim portion 46. Since a portion of the metal cap forms part of the chamber boundary, the cap is contoured 48 consistent with the contour 18 of the block.

In order to assure exact placement of the reactive element 30 the block bore hole 32 is counterbored at 50 to provide a stop surface for the cap rim 46 as the plug 34 is advanced through the block towards the chamber 20. Since the relationship between the pedestal portion 40 of the plug and the carefully dimensioned cap rim 46 is known, the reactive element 30 can be consistently and accurately located a known distance relative to the diaphragm 24. Similarly, the stop surface 50, by limiting the travel of the rim portion of the cap, also assures proper alignment of the outer edge 52 of the cup portion relative to the edge 54 of the block at the bore hole penetration of the chamber. It is essential that these two edges conform to the overall contour 18 of the chamber. A significant deviation from this contour could result in permanent local deformation of the diaphragm during over pressurization.

With the present invention, the cup portion 44 of the cap 36 has a nominal outer diameter that is smaller than the inner diameter of the bore hole penetration of the chamber, such that a nominal diametral gap 56 exists therebetween preferably between about 0.002 and 0.004 inch, to accomodate differential thermal expansion. As earlier described, the block 12 and cup 36 are made of different materials. In the prior art, covers for the reactive element have typically been welded to the block, but these welds were subject to differential temperature induced stresses. Also, the induced stresses and the difference in material often produce corrosion failure at the interface. The nominal cap 56 provided with the present invention avoids these problems.

In the preferred embodiment, the cap 36 is sealed against the block 12 by means of a spring metal O-ring seal 58 of silver and inconel. The bore hole 32 may be doubly counterbored to provide an inner shoulder 60 in addition to the previously described outer shoulder 50. It is a relatively simple design matter to assure that the O-ring 58 will be compressed as the mounting plug 34 is advanced, before the stop limit of the first or outer shoulder 50 is effected against the rim portion 46 of the metal cap cover.

In the preferred embodiment, the mounting plug 34, reactive element 30 and cover or cap 36 are removeable and replaceable within a given housing block 12. Referring to FIGS. 1 and 2, it can be readily understood that in the preferred embodiment the housing block 12 has a doubly counterbored hole running from the outer portion of the block to the chamber 20. A mounting plug 34 carrying the reactive element 30 would typically have the core 62 and windings 64 covered by an epoxy potting compound 66. The cap 36 is then fit snugly over the reactive element 30 onto the head portion 38 of the plug. Note that the plug typically has a conduit 68 though which the electrical leads 70 may exit the housing. The plug has means thereon for advancing within the bore hole, typically 72 a notch by which the plug may engage mating threads 74 in the bore hole until the stop surface 50 on the outer shoulder is reached.

What is claimed is:

1. In a fluid pressure transducer including a housing having oppositely facing magnetic blocks forming a sealed chamber in which is disposed a magnetically permeable diaphragm for deflection by the pressure of the fluid, and reactive elements mounted within the blocks for producing a differential output signal in response to a deformation of the diaphragm, an improved mounting arrangement for each element comprising:

wall means defining a bore hole extending through the block to the chamber and being double counterbored to provide inner and outer shoulders relative to the bore axis;

a mounting plug having an elongated portion for engagement with the bore hole, a pedestal portion for supporting the element near the chamber, and means for aligning the element on the pedestal;

a unitary cap for covering the plug and sealing the element from the fluid in the chamber, having a hollow inner portion for covering the reactive element and having a flat rim portion that is secured between the plug and the outer shoulder;

a metal O-ring located on the outer portion of the cap and urged thereby against the inner shoulder of the bore hole; and means for advancing and retaining the plug in the bore hole such that the O-ring is compressed against the inner shoulder by the flat portion of the cap, whereby the plug and element are sealed against intrusion by the fluid from the chamber.

2. The reactive element mounting arrangement of claim 1 wherein the nominal outer dimension of the hollow portion of the cup is smaller than the inner dimension of the bore hole, such that a nominal gap is provided therebetween to accomodate differential thermal expansion.

3. The mounting arrangement of claim 2 wherein the diametrical gap is between about 0.002 and 0.004 inch.

4. The mounting arrangement of claim 1 wherein the reactive element is immobilized between the cap and the pedestal by an epoxy potting compound.

5. The mounting arrangement of claim 1 wherein the rim portion of the cap is of a precise thickness whereby advancement of the plug into the bore hole is limited by the firm contact of the rim with the plug and the outer shoulder of the bore hole such that the element is located a predetermined distance from the diaphragm.

6. In a fluid pressure transducer including a housing having oppositely facing magnetic blocks forming a sealed chamber in which is disposed a magnetically permeable diaphragm for deflection by the pressure of the fluid, and reactive elements mounted within the blocks for producing a differential output signal in response to the deflection of the diaphragm, an improved mounting arrangement for each element, comprising:
  wall means defining a bore hole extending through the block to the chamber, and being counterbored to provide shoulder means relative to the bore axis;
  an elongated mounting plug having a shouldered head portion for engagement with the bore hole shoulder means, a pedestal portion for supporting the element near the cavity, and means for aligning the element on the pedestal;
  a non-magnetic metal cap seated on the plug for sealing the element from the fluid in the cavity, having a generally cup-like inner portion for covering the element and a flat rim portion between the plug shoulder and the borehole shoulder means;
  a flexible seal member located between the rim of the cap and the borehole shoulder means;
  means for advancing and retaining the plug in the borehole such that the seal member is compressed against the shoulder means to form a seal against the intrusion of fluid from the chamber into the borehole;
  whereby the element is sealingly supported a predetermined distance from the undeflected diaphragm.

* * * * *